May 6, 1930.                H. G. RENNER                1,757,143
                       NUT MOUNTED UPON SHEET METAL
                           Filed Oct. 14, 1927

Inventor
Harold G. Renner

By Swan, Fryer & Murray
Attorneys

Patented May 6, 1930

1,757,143

UNITED STATES PATENT OFFICE

HAROLD G. RENNER, OF DETROIT, MICHIGAN

NUT MOUNTED UPON SHEET METAL

Application filed October 14, 1927. Serial No. 226,233.

This invention relates to nuts and particularly to nuts mounted upon sheet metal.

It is an object of the invention to firmly and permanently secure a nut upon a metal sheet by striking up a pair of tongues from said sheet, placing said nut between said tongues, and bending said tongues to bear downwardly upon said nut.

More specifically it is an object of the invention to form notches in opposite edges of a nut, to engage in said notches a pair of spaced tongues struck up from a metal sheet, and to bend said tongues into retaining engagement with the top face of said nut.

Another object is to adapt a nut of the above described character to be formed in quantities from standard bar stock.

A further object is to form a nut from bar stock having oppositely bevelled edges, thus facilitating the notching of said edges for engagement by elements securing said nut to a metal sheet.

These and various other objects the invention attains by the construction hereinafter described and illustrated in the accompanying drawing, wherein:—

Figure 1:
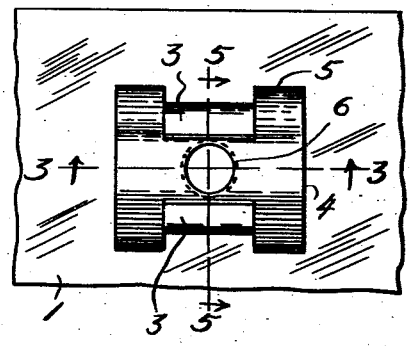
Figure 1 is a plan view of a nut secured to a metal sheet in accordance with this invention.
Figure 2:
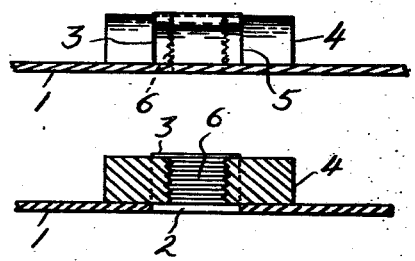
Figure 2 is a view of the same in side elevation and partial section.
Figure 3:
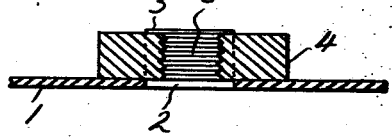
Figure 3 is a sectional view taken upon the line 3—3 of Figure 1.
Figure 4:
Figure 4 is a view of the construction in end elevation and partial section.
Figure 5:
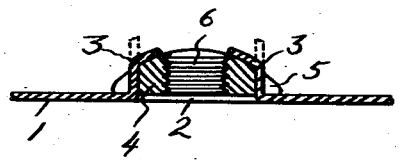
Figure 5 is a sectional view taken upon the line 5—5 of Figure 1.

In these views the reference character 1 designates a sheet metal member in which a rectangular opening 2 is formed by striking up from said member a pair of similar rectangular tongues 3 which are initially fully transverse to the member 1. It is a function of the tongues 3 to secure to the member 1 a nut 4 which is preferably of an elongated rectangular form and which has its opposite edges notched as indicated at 5 to receive the tongues 3. In securing said nut upon the member 1 the nut is first placed against said member covering the aperture 2 with the tongues 3 entered in the notches 5 as indicated in dash lines in Figure 5. The tongues 3 are bent over upon the nut 4 so as to prevent any withdrawal of the nut from the metal sheet.

The nature of the tools employed to form the opening 2 and to strike up the tongues 3 at right angles to the member 1 and to finally overturn the end portions of said tongues will be readily apparent to those familiar with this art. It may, however, be noted that these various operations may be performed quickly and economically in an ordinary punch press, and that the dies necessary for said operations are comparatively simple and inexpensive.

The rectangular form of the nut 4 adapts it to be inexpensively cut from bar stock. Preferably the nuts are formed from bars having transversely bowed top faces whereby the opposite edges of the nuts are bevelled, thus facilitating forming of the notches 5 by a punching operation. That is to say, the formation of the nuts with opposite beveled edges reduces the thickness of material which must be punched out to form said notches. The screw-threaded opening 6 of the nut may be punched out and tapped in any desired sequence to punching out of the notches 4 and cutting off the nut from the bar stock.

The described construction serves in a very simple manner to quite firmly secure a nut upon one face of a sheet of metal and leaves the other face of said sheet entirely unobstructed for engagement by any part which it is desired to bolt to said nut.

While it will be apparent that the illustrated embodiments of my invention herein disclosed are well calculated to adequately fulfil the objects and advantages primarily stated, it is to be understood that the invention is susceptible to variation, modification and change within the spirit and scope of the subjoined claims.

What I claim is:

1. The combination with a nut having a pair of notches formed in opposite edges thereof, of a sheet metal member seating said nut, and having a pair of tongues struck up therefrom and engaging in said notches, said tongues being terminally bent down upon the outer face of said nut to hold the nut in a definite position upon said member.

2. The combination with a nut having a pair of notches formed in opposite sides thereof, of a sheet metal member having an opening and seating said nut marginally of said opening, and having a pair of tongues struck out of said opening integrally with opposite edges thereof engaging in said notches, the outer face of said nut being beveled from its central portion toward its notched edges to largely reduce the thickness of the nut at said edges, said tongues being terminally bent down upon the beveled face of said nut, holding the nut from rotation and in a definite position upon said member.

3. The combination with a nut having notched opposite edges, and having one of its end faces substantially flat and the other beveled from its center portion to the notched edges of the nut largely reducing the thickness of the nut at said edges, of a sheet metal member having an opening and seating the flat face of said nut marginally of said opening, and a pair of tongues upon said sheet metal member struck out of said opening and engaging in said notches, definitely positioning the nut upon said member, and positively restraining it against rotation.

In testimony whereof I sign this specification.

HAROLD G. RENNER.